United States Patent Office 2,727,790
Patented Dec. 20, 1955

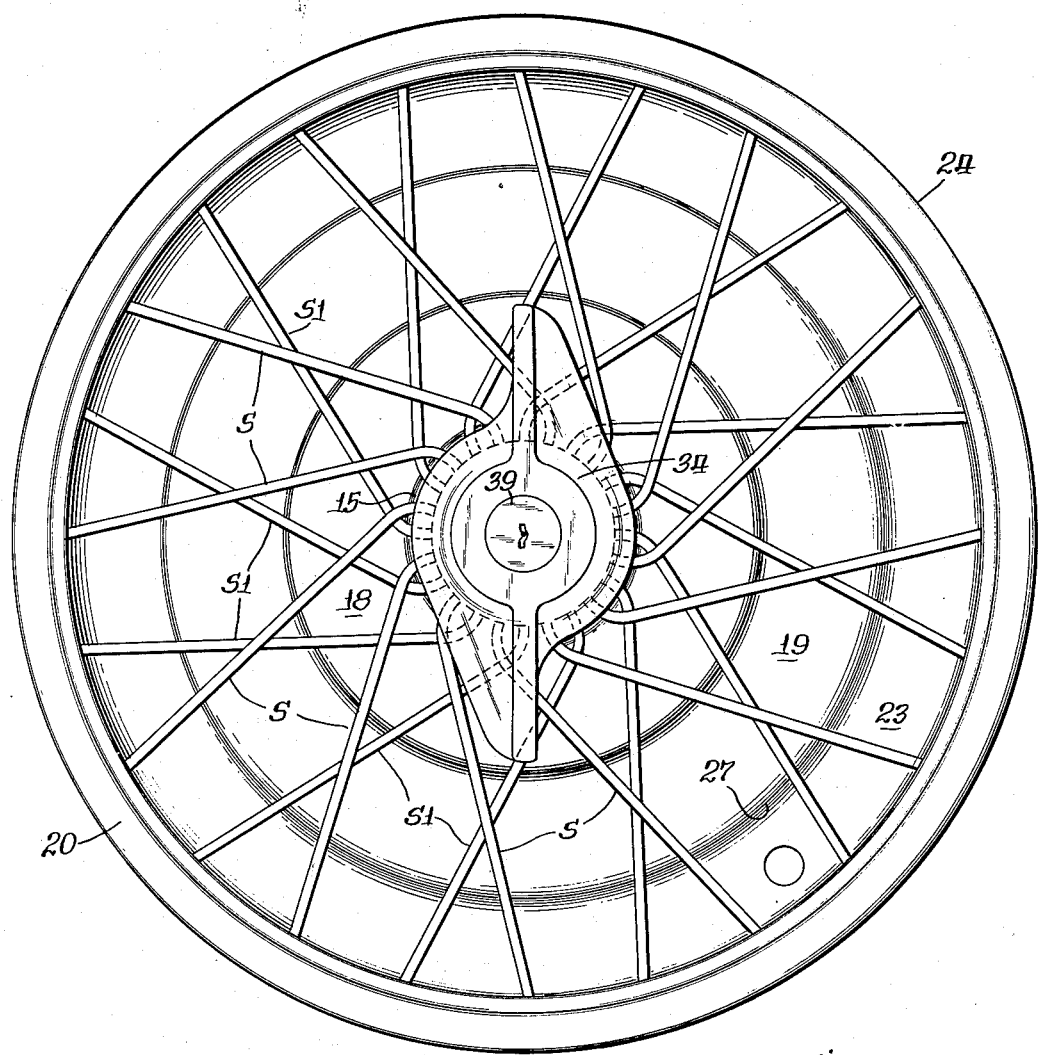
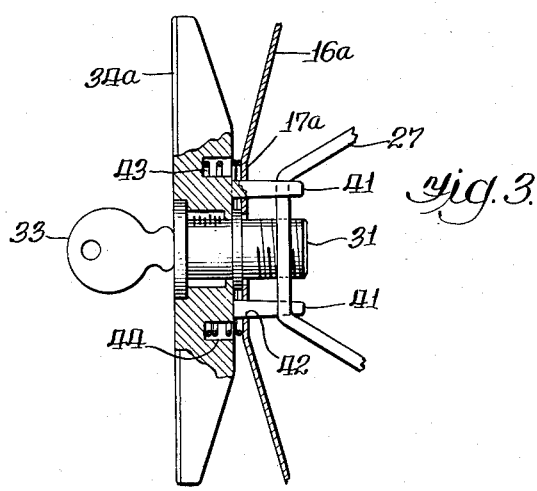
Fig. 1.
Fig. 3.
INVENTOR.
James K. Gaylord
BY
Gary, Desmond + Parker
Attys.

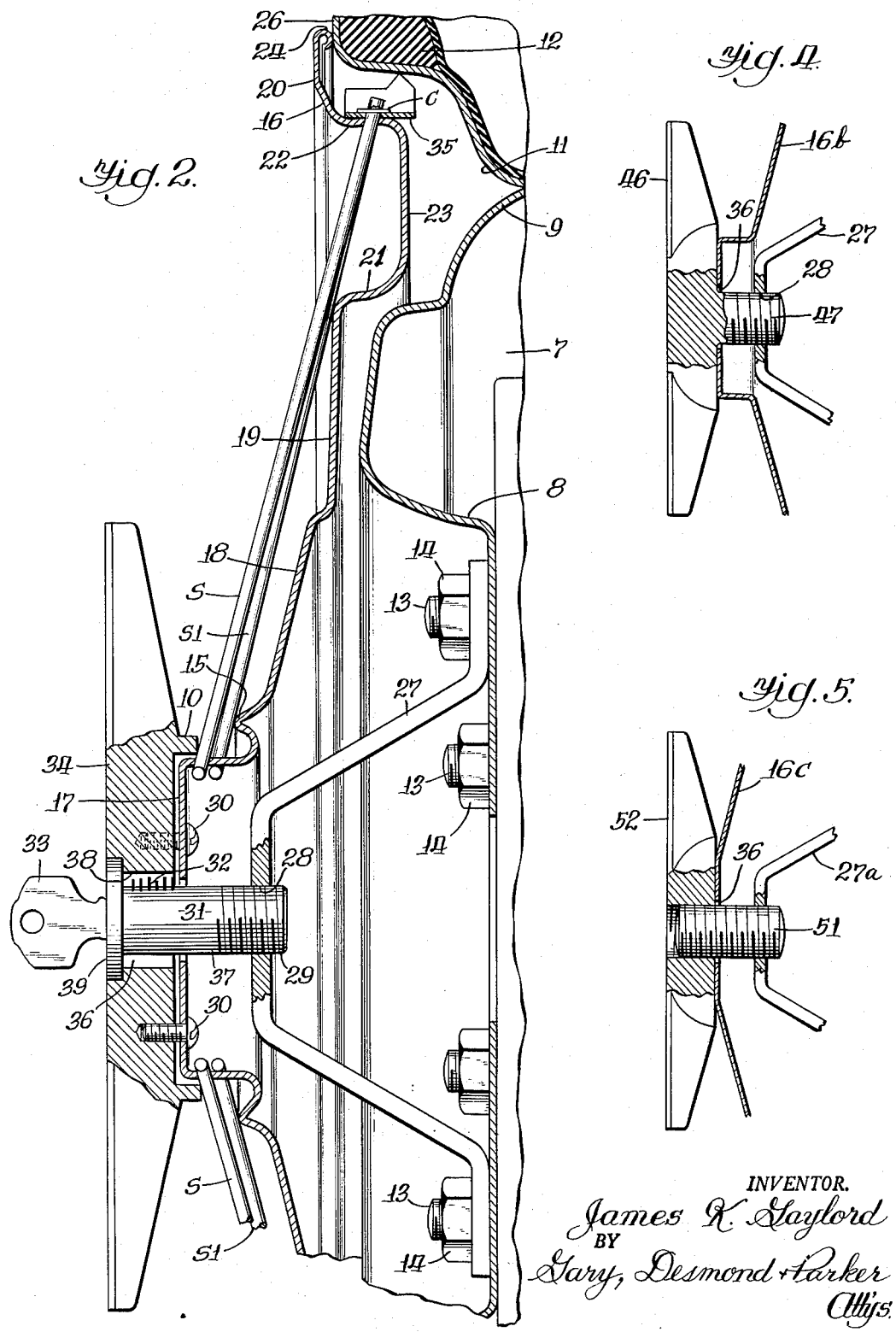

2,727,790

WHEEL COVERS

James K. Gaylord, Chicago, Ill., assignor to Gaylord Products, Incorporated, Chicago, Ill., a corporation of Delaware Application May 18, 1953, Serial No. 355,731

3 Claims. (Cl. 301—37)

This invention relates to wheel covers and more particularly to a trim structure adapted to be mounted on the outer side of an automobile wheel to enhance the appearance thereof, and has for an object the provision of a simple and inexpensive means for detachably securing the trim structure to a conventional wheel.

Another object of the invention resides in the provision of a trim structure in which a circular trim plate is detachably secured to a conventional wheel by means of a bracket secured to the wheel for threaded engagement with a hub cap.

A further object of the invention resides in the provision of resilient means interposed between the hub cap and trim plate to urge and maintain the latter in annular abutting engagement against the outer side of a wheel rim to eliminate vibration and noise during operation of the automobile.

Another object of the invention resides in the provision of a hub cap provided with a lock mechanism to prevent unauthorized removal of the trim structure and/or wheel and tire assembly.

Another object of the invention resides in the provision of a wheel cover embodying a plurality of wire spokes having their ends engaged within apertures formed in the cover, the spokes being engaged against vibration or rotational movement relative to each other by means of a hub cap mounted on the cover.

This invention embodies other novel features, details of construction and arrangement of parts which are hereinafter set forth in the specification and claims and illustrated in the accompanying drawings, wherein:

Fig. 1 is a side elevational view illustrating a wheel cover embodying features of the present invention.

Fig. 2 is an enlarged fragmentary transverse sectional view of same.

Fig. 3 is a fragmentary transverse sectional view, corresponding to Fig. 2, showing a modified form of the invention.

Fig. 4 is a fragmentary transverse sectional view, corresponding to Fig. 2, showing another modified form of the invention.

Fig. 5 is a fragmentary transverse sectional view, corresponding to Fig. 2, showing another modified form of the invention.

Referring now to the drawings for a better understanding of the invention, and more particularly to Figs. 1 and 2 therein, the trim structure is shown as applied to a conventional automobile wheel 7 comprising a support plate 8 having an annular flange 9 secured to a tire rim 11 formed to receive a tire 12, the support plate being formed with apertures to receive mounting bolts 13 having nuts 14 threaded thereon.

The trim structure is shown as comprising a circular cover plate 16 formed to provide a hub portion 17, an inner annular step portion 18 merging with an outer annular step portion 19, concentric inner and outer annular walls 21 and 22 connected by a web 23, and an annular rim portion 20 merging with the outer annular wall 22.

An annular inturned lip 24 is formed on the periphery of the plate 16 for annular abutting engagement with the outer side wall 26 of the tire rim 11.

A mounted bracket 27 formed from a length of strip metal is provided at its ends with apertures to receive diametrically opposed mounting bolts 13, the medial portion of the bracket projecting outwardly from the wheel and being formed with a threaded opening 28 to receive the threaded portion 29 of a conventional barrel lock mechanism 31 having retractable keepers 32 actuated responsive to insertion or withdrawal of a key 33.

A hub cap 34 secured to the hub portion 17 of the cover plate 16 by screws 30 is formed with an opening 36 to receive the lock mechanism body 37, the opening having diametrically opposed slots 38 to receive the retractable keepers 32. The hub cap 34 is engaged on its outer side by an annular flange 39 provided on the body 37 of the lock mechanism, and is formed on its inner side with an annular flange 10 to coact with an annular shoulder 15 on the cover plate 16 to clamp outer and inner rows of spokes S and S1, respectively, therebetween. The ends of the spokes extend through apertures formed in the hub portion 17 and annular wall 22 of the cover plate 16, the inner ends of the spokes being offset within the hub portion and the outer ends of the spokes having clips C thereon.

As illustrated in Fig. 1, the outer row of spokes S are angularly disposed with respect to adjacent spokes in the inner row and overlie and engage same whereby the spokes may be tightly clamped between the flange 10 and shoulder 15 to eliminate vibration and noise and rotation of the spokes relative to each other.

In mounting the trim structure upon a wheel 7, the cover plate 16 is first positioned with the annular lip 24 in abutting engagement against the outer side wall 26 of the tire rim 11 with the opening 36 in registry with the threaded opening 28 in the bracket 27. The lock mechanism 31, with key 33 therein, is then inserted into the opening 36 in the hub cap 34 and rotated to thread the end 29 of the lock mechanism into the opening 28 in the bracket 27. The key 33 is then withdrawn from the lock mechanism to permit the keepers 32 to move radially into the adjacent slot 38 in the hub cap to thus lock the trim structure to the wheel 7.

After the trim structure has thus been secured to a wheel, it will be noted that the screws 30 serve to clamp the spokes between the shoulder 15 and flange 10 while the lock mechanism acts to urge the cover plate 16 toward the wheel to maintain the annular lip 24 in tight abutting engagement against the outer side wall 26 of the tire rim 11 to prevent vibration of these parts and resultant noise during operation of the vehicle. It will also be noted that the lock mechanism prevents unauthorized removal of the trim structure from the wheel and removal of the wheel from the vehicle. After the trim structure has been locked on a wheel, pointed clips 35 mounted on the cover 16 engage the rim 11 (as shown and described with greater particularity in my copending application Serial No. 334,490, filed February 2, 1953), to prevent rotation of the trim structure relative to the wheel.

Fig. 3 in the drawings illustrates a modified form of the invention in which the hub cap 34a is provided with lugs 41—41 slidably engaged within apertures 42—42 formed in the hub portion 17a of the cover plate 16a. A helical compression spring 43 is mounted within an annular recess 44 formed in the inner side of the hub cap for engagement against the outer side of the hub portion 17a to yieldably resist axial movement of the hub cap toward the cover plate. The hub cap is provided with a lock mechanism 31 for detachably securing the hub cap and cover plate to the bracket 27, as heretofore shown and described in connection with the form of the invention illustrated in Figs. 1 and 2.

Fig. 4 in the drawings illustrates a modified form of the invention in which a hub cap 46 in the form of a wing bolt is provided with a threaded portion 47 adapted to be inserted through the opening 36 in the cover plate 16b for threaded engagement in the threaded opening 28 in the bracket 27.

Fig. 5 illustrates another modified form of the invention in which a bracket 27a is provided with a threaded stud 51 secured thereto and adapted to project through the opening 36 in the cover plate 16c to receive a wing nut 52 to clamp the cover plate to a vehicle wheel.

While this invention has been shown in several forms, it is obvious to those skilled in the art that it is not so limited but is susceptible of various changes and modifications without departing from the spirit and scope of the claimed invention.

I claim as my invention:

1. In a trim structure for an automobile wheel, a circular cover plate having a hub portion, a rim portion and an annular shoulder adjacent the hub portion, inner and outer rows of wire spokes having their ends disposed in apertures formed in said hub and rim portions and arranged with each outer spoke crossing over and engaging adjacent inner spokes, and a hub cap mounted on said hub portion coacting with said annular shoulder to clamp said spokes therebetween.

2. In a trim structure for an automobile wheel, a circular cover plate having a hub portion, a rim portion and an annular shoulder adjacent the hub portion, inner and outer rows of wire spokes having their ends disposed in apertures formed in said hub and rim portions and arranged with each outer spoke crossing over and engaging adjacent inner spokes, a hub cap mounted on said hub portion coacting with said annular shoulder to clamp said spokes therebetween, and means to move said hub cap toward said hub portion.

3. In a trim structure for an automobile wheel, a circular cover plate having a hub portion, a rim portion and an annular shoulder adjacent the hub portion, inner and outer rows of wire spokes having their ends disposed in apertures formed in said hub and rim portions and arranged with each outer spoke crossing over and engaging adjacent inner spokes, a hub cap mounted on said hub portion coacting with said annular shoulder to clamp said spokes therebetween, and means including a threaded element to move said hub cap toward said hub portion.

References Cited in the file of this patent

UNITED STATES PATENTS

| | | |
|---|---|---|
| 2,328,301 | Shaw | Aug. 31, 1943 |
| 2,329,945 | Schatzman | Sept. 21, 1943 |
| 2,693,394 | Gamet et al. | Nov. 2, 1954 |

FOREIGN PATENTS

| | | |
|---|---|---|
| 13,647 | Great Britain | 1914 |
| 415,681 | Great Britain | Aug. 30, 1934 |
| 526,576 | Great Britain | Sept. 20, 1940 |
| 809,661 | France | Dec. 12, 1936 |
| 279,319 | Italy | Nov. 8, 1930 |